(12) United States Patent
Rathmann et al.

(10) Patent No.: US 9,227,793 B2
(45) Date of Patent: Jan. 5, 2016

(54) SYSTEM AND METHOD FOR MONITORING THE CONDITION OF A CONVEYOR BELT

(71) Applicant: ABB TECHNOLOGY AG, Zürich (CH)

(72) Inventors: Boris Rathmann, Cottbus (DE); Ulf Richter, Cottbus (DE)

(73) Assignee: ABB TECHNOLOGY AG, Zurich (CH)

( * ) Notice: Subject to any disclaimer, the term of this patent is extended or adjusted under 35 U.S.C. 154(b) by 14 days.

(21) Appl. No.: 14/338,977

(22) Filed: Jul. 23, 2014

(65) Prior Publication Data

US 2014/0336812 A1 Nov. 13, 2014

Related U.S. Application Data

(63) Continuation of application No. PCT/EP2012/050949, filed on Jan. 23, 2012.

(51) Int. Cl.
*G06F 7/00* (2006.01)
*B65G 43/02* (2006.01)

(52) U.S. Cl.
CPC .................................... *B65G 43/02* (2013.01)

(58) Field of Classification Search
CPC .................................................. G06Q 10/087
USPC ......................................................... 700/213
See application file for complete search history.

(56) References Cited

U.S. PATENT DOCUMENTS

| | | |
|---|---|---|
| 4,436,198 A | 3/1984 | Houck et al. |
| 6,047,814 A | 4/2000 | Alles et al. |
| 7,308,322 B1 * | 12/2007 | Discenzo ........... G05B 23/0221 700/175 |
| 7,427,767 B2 | 9/2008 | Kemp |
| 9,146,175 B2 * | 9/2015 | Saarinen ............. G01M 13/021 |

FOREIGN PATENT DOCUMENTS

| | | |
|---|---|---|
| DE | 31 11 219 A1 | 10/1982 |
| DE | 31 31 963 A1 | 2/1983 |
| DE | 10 2008 018 238 A1 | 10/2009 |
| DE | 10 2009 052 592 A1 | 5/2011 |

OTHER PUBLICATIONS

International Search Report (PCT/ISA/210) mailed on Sep. 25, 2012, by the European Patent Office as the International Searching Authority for International Application No. PCT/EP2012/050949.

* cited by examiner

*Primary Examiner* — Kyle Logan
(74) *Attorney, Agent, or Firm* — Buchanan Ingersoll & Rooney PC

(57) ABSTRACT

A system and a method are disclosed for monitoring a condition of a conveyor belt arranged to rotate about at least a motor drive pulley and an idler pulley. A sensor unit can determine at least one sensor signal representing at least one operating variable of the electrical motor. A data processing unit can derive from the sensor signal at least one corresponding time dependent data signal, to detect irregularities in the data signal which indicate that a splice region of the conveyor belt passes the drive pulley and/or the idler pulley, to determine from a change in shape or in frequency of the irregularities, whether the condition of the conveyor belt has changed, and to send a signal which reflects a change in the condition of the conveyor belt to at least one of a display unit, a storage unit and/or a decision making unit.

20 Claims, 5 Drawing Sheets

SYSTEM AND METHOD FOR MONITORING THE CONDITION OF A CONVEYOR BELT

RELATED APPLICATION

This application claims priority as a continuation application under 35 U.S.C. §120 to PCT/EP2012/050949 filed as an International Application on Jan. 23, 2012 designating the U.S., the entire content of which is hereby incorporated by reference in its entirety.

FIELD

The present disclosure relates to a system and a method for monitoring the condition of a conveyor belt, such as a conveyor belt arranged to rotate about at least a drive pulley and an idler pulley where an electrical motor is arranged to drive the drive pulley, and the system includes at least one sensor unit.

BACKGROUND INFORMATION

Belt conveyor systems are used for bulk material or goods transportation in different industries, such as mining. A conveyor system includes a conveyor belt which carries the bulk material, such as coal or lignite, or the goods, and transports them continuously over a long distance from one point to another. In the mining industries, the belt conveyor systems are subject to harsh environmental conditions which can cause wearing of the conveyor belt material and result in damage of the belt, such as cracks and rips. Such damage does not only reduce the lifetime of the conveyor belt but may also lead to an unexpected stop of production if not recognized in time to organize for the maintenance of the belt. Because the conveyor belt is continuously moving under normal operating conditions, it can be difficult to monitor the condition of the belt and to measure the state of wear and tear or to detect any damage.

In the art, it is known to integrate embedded measuring parts like stress sensors, induction loops or antennas in the conveyor belt material. These embedded measuring parts interact with corresponding contactless receivers for example through wireless communication or via ultrasonic or inductive signals, where the receivers are attached to the mechanical structure of the belt conveyor system.

For example, U.S. Pat. No. 6,047,814 discloses a method for monitoring a continuous moving belt, where two transponders are disposed in or on the belt in the connecting region of the belt, where the connecting region is the region in which the ends of the conveyor belt are connected to each other. The transponders each transmit a signal to an external transmitter/receiver unit when passing through an operating region of the external transmitter/receiver unit. The transponders are integrated circuits which are conductively connected to a coil. The transponders are positioned within the connecting region due to the fact that it was recognized that the connecting region is a weak location in the conveyor belt which should be monitored for signs of loosening.

In DE 10 2008 018 238 A1, a device for the non-destructive detection of an operating state of elastic components, such as conveyor belts made of rubber, is disclosed. In the conveyor belt, elastomer encoders are embedded in two so called measuring regions, where the first measuring region has a different timely behavior of its tensile strength compared to the second measuring region. The device further has a sensor station by which magnetic fields originating from the elastomer encoders can be detected when passing the sensor station, where the magnetic fields are then processed into information about the expansion or elongation of the corresponding measuring region.

The U.S. Pat. No. 4,436,198 describes a conveyor belt rip detection system, where a plurality of antennas is embedded in the belt generally transversely to the travel direction of the belt and where the respective antennas pass in capacitive coupling relation with a transmitter/receiver at a rip detector station and send an electrical signal to the transmitter/receiver. A rip or crack in the conveyor belt material will be recognized through the corresponding antenna being broken and not sending any signal to the transmitter/receiver.

An alternative solution for identifying the condition of a conveyor belt is known for example from U.S. Pat. No. 7,427,767 B2, where a device captures two-dimensional images of successive belt sections. The captured images are transmitted to an evaluation device where the images are compared with reference images and at least one statement about the condition of the belt is determined. The images are captured using either electromagnetic radiation (e.g., visible, infrared or ultraviolet light), or penetrating radiation, such as X-ray radiation.

SUMMARY

A system is disclosed for monitoring a condition of a conveyor belt arranged to rotate about at least a drive pulley and an idler pulley, where an electrical motor is arranged to drive the drive pulley, the system comprising: at least one data processing unit; at least one sensor unit arranged to determine at least one sensor signal representing at least one operating variable of an electrical motor, the at least one data processing unit being configured to: derive from the at least one sensor signal at least one corresponding time dependent data signal; detect irregularities in the at least one data signal which indicate that a splice region of a conveyor belt passes the drive pulley and/or the idler pulley; determine from a change in shape or frequency of the irregularities whether a condition of the conveyor belt has changed; and send a monitoring output signal which reflects a change in the condition of the conveyor belt to at least one of a display unit, a storage unit and/or a decision making unit.

A method is also disclosed for monitoring the condition of a conveyor belt, where the conveyor belt is arranged to rotate about at least a drive pulley and an idler pulley and where an electrical motor is arranged to drive the drive pulley, the method comprising: determining at least one sensor signal representing at least one operating variable of the electrical motor; deriving from the at least one sensor signal at least one corresponding time dependent data signal; detecting irregularities in the at least one data signal which indicate that a splice region of the conveyor belt passes the drive pulley and/or the idler pulley; determining from a change in shape or in points in time of the irregularities whether a condition of the conveyor belt has changed; and sending a monitoring output signal which reflects a change in the condition of the conveyor belt to at least one of a display unit, a storage unit and/or a decision making unit.

BRIEF DESCRIPTION OF DRAWINGS

Features and advantages disclosed herein will become apparent from the exemplary embodiments described in connection with the appended drawings which illustrate as follows.

DETAILED DESCRIPTION

Figure 1:
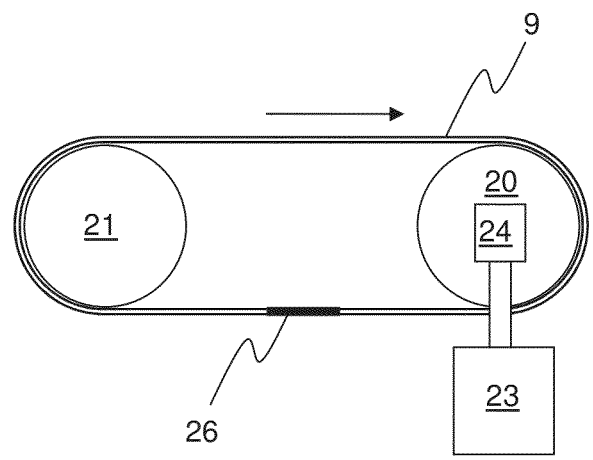
FIG. 1 shows an exemplary conveyor belt with a splice region.

The present disclosure sets forth embodiments which can improve known systems and methods for monitoring a condition of a conveyor belt.

In an exemplary system according to the disclosure, at least one sensor unit is arranged to determine at least one sensor signal representing at least one operating variable of an electrical motor driving a drive pulley, and at least one data processing unit is arranged to:
  derive from the at least one sensor signal at least one corresponding data time dependent data signal;
  detect irregularities in the at least one data signal which indicate that a splice region of the conveyor belt passes the drive pulley and/or an idler pulley;
  determine from a change in shape or in frequency of the irregularities, whether a condition of the conveyor belt has changed or not; and
  send a monitoring output signal which reflects a change in the condition of the conveyor belt to at least one of a display unit, a storage unit and/or a decision making unit.

An exemplary method according to the disclosure can include functions performed by the at least one sensor unit and by the data processing unit.

With an exemplary proposed system and method, it is no longer necessary to integrate embedded sensor elements or measuring parts in the conveyor belts or to provide specific external sensors, such as an image capturing apparatus. Instead, sensor information of the driving motor which is available for the normal operation of the conveyor belt can be used for the condition monitoring. Accordingly, the effort to install, operate and maintain a condition monitoring system can be considerably reduced compared to the known systems.

In one or multiple time dependent data signals derived from the sensor information, irregularities can be detected which indicate the points in time when the splice region of the belt passes the drive pulley and/or the idler pulley. The splice region is a region in which ends of the conveyor belt are connected to each other to form a joint or junction. The joint can be made by lapping or butting, straight or on a bias, and it can be held together through vulcanization or mechanical means. The splice region may also be called joint region or connecting region.

Exemplary embodiments are based on recognition that irregularities can be observed permanently in measurement signals taken at a belt conveyor system, since a splice region has other mechanical characteristics than the rest of the conveyor belt due, for example, to being thicker. As a result, the splice region applies different forces to the drive pulley and/or the idler pulley than the rest of the belt.

When the condition of the conveyor belt changes (e.g., when the belt material weakens and starts to elongate) or when rips and cracks occur which also can result in a beginning elongation of the belt, a shape and/or frequency of irregularities can start to differ from those irregularities occurring with an intact conveyor belt. According to exemplary embodiments, these differences can be detected by the data processing unit and a corresponding monitoring output signal is displayed and/or stored and/or sent to a decision making unit for deciding whether maintenance or exchanging of the conveyor belt becomes desirable or necessary.

Thus, a system and method are disclosed for a non-invasive monitoring of the state of the conveyor belt, which can be easily implemented in an existing conveyor belt system. Since known available sensor information of the electrical motor can be used, the effort to integrate measuring parts in the belt material and to arrange a corresponding receiving device or an external sensor device at the belt conveyor system is avoided.

For example, the at least one operating variable of the electrical motor is one of a voltage, a current, a rotational speed, an acceleration, a torque or a force signal, and the at least one sensor unit can be a current and/or voltage sensor, a speed encoder, a torque transducer, for example a strain gauge, or a force transducer.

The at least one data signal may represent an amplitude over time or a frequency spectrum, where the time dependency of the frequency spectrum can be achieved by repeatedly deriving the spectrum for subsequent points in time from the corresponding sensor signal.

The at least one data processing unit may either be a single stand-alone processing device or it may be two or more processing devices interoperating with each other, where the two or more processing devices may be integrated in one and the same computer unit or in separate units.

In an exemplary embodiment, one or more of the processing devices can be integrated parts of an electrical converter, such as a frequency converter, where the converter is connected to the electrical motor and is arranged to supply it with a current and/or voltage. Electrical motors nowadays can be supplied and controlled via a corresponding electrical converter, where the controlling is performed in a processing device belonging to the converter. This processing device can be supplied with one or multiple sensor signals representing one or multiple operating variables of the motor, respectively, and can derive from these sensor signals the corresponding time dependent data signals, which are desirable for the control functions, such as current, voltage, torque and/or speed. Accordingly, it can be especially advantageous to apply the proposed monitoring method in those cases where the driving motor of the conveyor belt is supplied via an electrical converter, since the desired data signals are already present and need only be further processed with respect to the irregularities.

The at least one data processing unit may be arranged to determine whether the condition of the conveyor belt has changed or not by comparing the shape and/or the frequency of the irregularities either with a corresponding threshold or with the shape and frequency of a reference irregularity, where the reference irregularity can advantageously represent an intact and healthy conveyor belt. Alternatively, a model-based state observer may be used for determining the state or condition of the conveyor belt.

The shape of the irregularities may be determined from a change in the amplitude height and/or from a change in the width of peaks of the irregularities.

In an exemplary embodiment of the system and in the corresponding method, the at least one sensor unit can be arranged to determine a first sensor signal and a second sensor signal representing a first and a second operating variable of the electrical motor, respectively, and where the at least one data processing unit is arranged to derive corresponding first and second data signals and to detect irregularities either in the first signal if the corresponding operating variable of the electrical motor is controlled to follow a first reference variable or in the second signal if the corresponding operating variable of the electrical motor is controlled to follow a second reference variable.

The first sensor signal may for example be a speed signal and the second sensor signal may be a torque signal. The speed and torque are mechanical operating variables of the electrical motor, which can both be controlled. In general, since a control algorithm in general can be configured to react to any unwanted irregularities and try to reduce them, the effects of the splice region may become less visible in the data signals corresponding to a controlled variable compared to the data signals of an uncontrolled variable. Therefore, it is suggested to look for the irregularities in the signal of an uncontrolled variable (e.g., to observe the irregularities in the speed signal if the torque of the motor is controlled and vice versa).

An exemplary system and method for monitoring the condition of the conveyor belt may be extended by in addition taking into account a vibration data signal, which may be derived in the form of an acceleration or speed sensor signal delivered by a vibration measurement unit, where the vibration measuring unit measures the vibration of a mechanical part attached to the electrical motor, such as the motor drum, a gear or a bearing.

In a further extension of the system, the conveyor belt can be arranged to rotate further about a take-up pulley, and the at least one data processing unit is arranged to determine a change in the condition of the conveyor belt by further taking into account a displacement sensor signal delivered by a distance measurement unit measuring the displacement of the take-up pulley.

Even further, a belt tension sensor signal delivered by a force measurement unit and/or an image sensor signal delivered by a radiation sensor observing the conveyor belt may be taken into account.

FIG. 1 shows a simple exemplary conveyor belt 9 which rotates about a drive pulley 20 and an idler pulley 21. The conveyor belt can be of comparatively short having an exemplary length of about 18 meters. The conveyor belt can have one splice region 26, where the splice region is the region where the ends of the belt material overlap and are fastened with each other. Other, and in particular longer, conveyor belts may have more than just one splice region. The splice region of the conveyor belt of FIG. 1 is approximately, for example, 4 meters long. An electrical motor 23 drives the drive pulley, where a gear 24 is installed between motor 23 and drive pulley 21.

Figure 4:
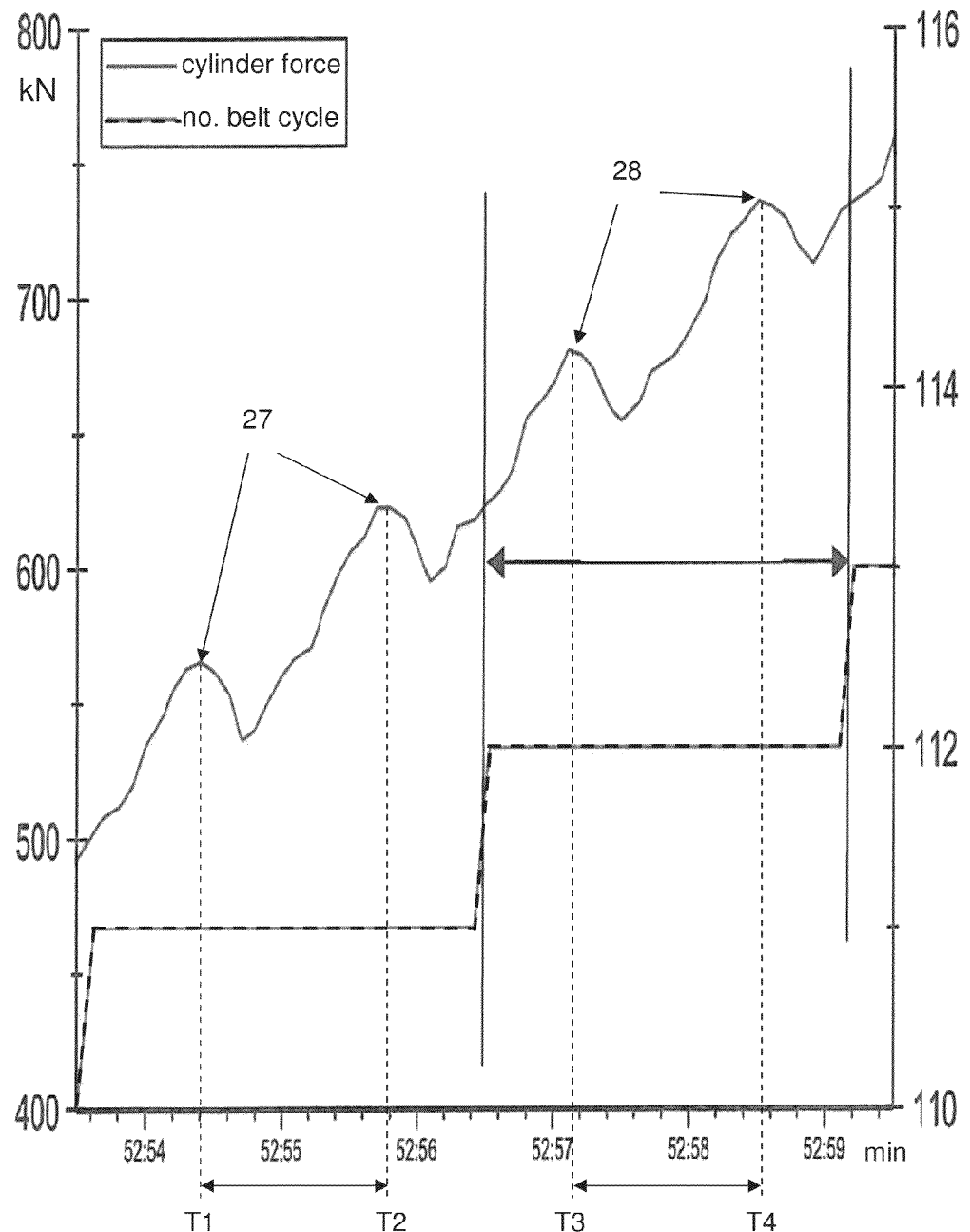
FIG. 4 shows an exemplary diagram of a cylinder force of a drive pulley of FIG. 1.

FIG. 4 shows the exemplary measurement signal of a force transducer taken at the cylinder of idler pulley 21 of FIG. 1. Apart from the force signal which is depicted as a solid line in the upper region of the diagram, FIG. 4 also shows the number of belt cycles (e.g., the number of revolutions of the belt). The corresponding line is the dotted line in the lower region of the diagram. As can be seen, the $111^{th}$ and the $112^{th}$ cycle are depicted in their full length.

The conveyor belt 9 of FIGS. 1 and 4 is intact, without any rips or cracks. The operating state shown in FIG. 4 is a linear acceleration of the conveyor belt. Accordingly, the cylinder force should simply show a linear increase. However, two irregularities in the form of peaks 27 occur in the force signal during the $111^{th}$ cycle at points in time T1 and T2, and two irregularities in the form of peaks 28 occur during the $112^{th}$ cycle at points in time T3 and T4. As was recognized by the inventors, these peaks are no exceptions but can occur frequently and coincide with the passing of the splice region at the drive pulley 20 and the idler pulley 21, respectively. In other words, for example, the first of the two peaks 27 and 28, respectively, always occurs when the splice region 26 passes the drive pulley 20, and the second of the two peaks 27 and 28, respectively, indicates the passing of the idler pulley 21.

Further tests have shown that it is also possible to observe similar kinds of irregularities in the signals of the rotational speed and of the electrical current and torque of the motor.

Figure 5:
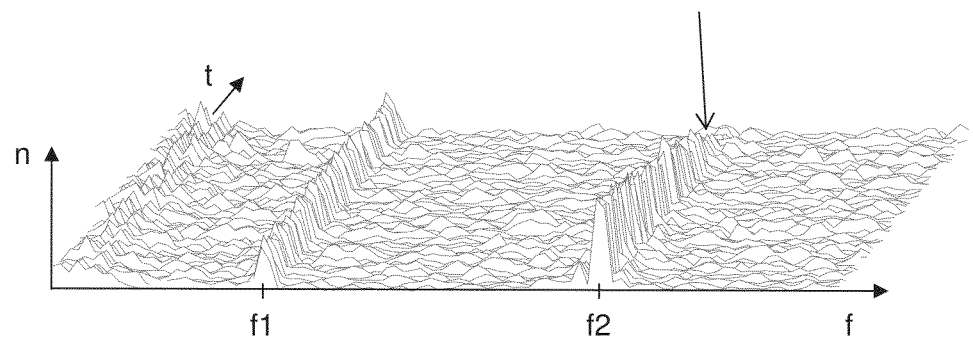
FIG. 5 shows an exemplary time dependent frequency spectrum of rotational speed of a motor driving the conveyor belt of FIG. 1.
Figure 6:
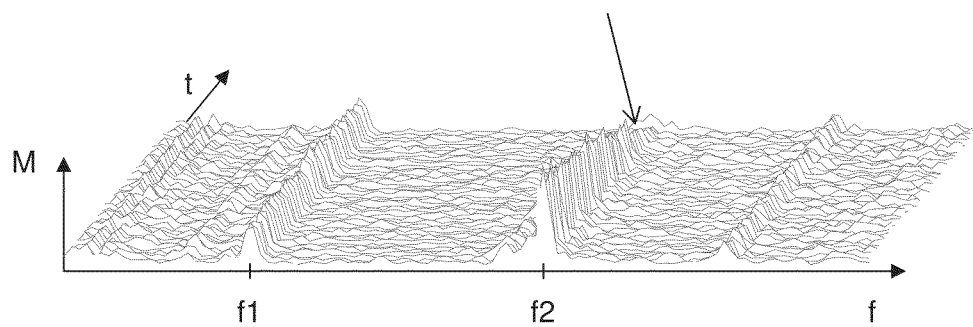
FIG. 6 shows an exemplary time dependent frequency spectrum of torque of the motor driving the conveyor belt of FIG. 1.
Figure 7:
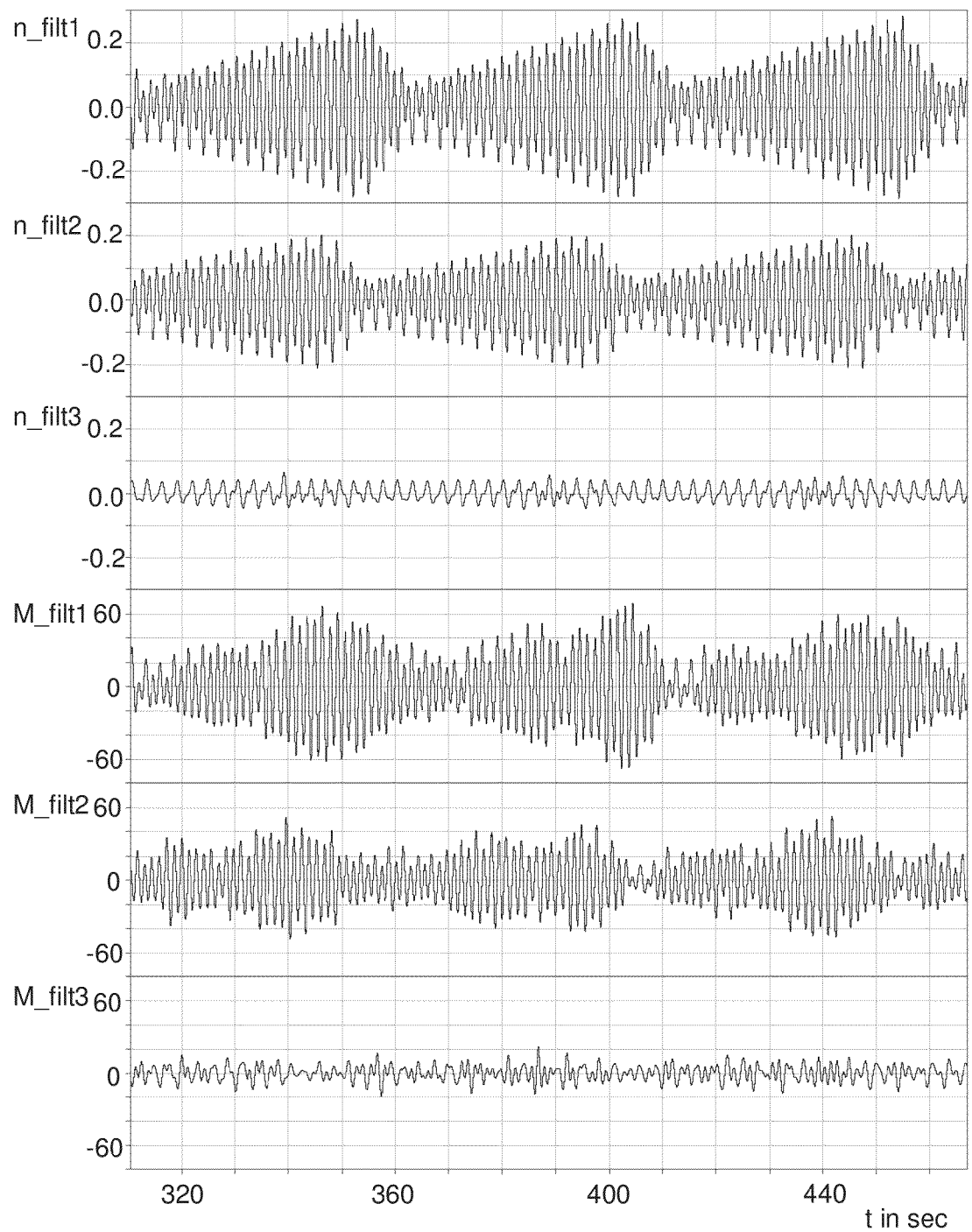
FIG. 7 shows exemplary amplitude over time diagrams for rotational speed and torque of the motor of FIG. 1, at different points in time.

In FIGS. 5 to 7 the exemplary results of long time tests of the conveyor belt 9 of FIG. 1 are depicted. FIG. 5 shows a series of frequency spectra of the rotational speed "n" of motor 23 which were generated at subsequent points in time "t". In this specific example, each frequency spectrum was calculated about 30 minutes after the previous one, so that FIG. 5 covers an overall time period of about two days. The amplitude and frequency ranges are both adjusted so that the dominant amplitude of the actual motor frequency is not visible. A first row of considerable amplitudes belongs to the rotational frequency f1 of conveyor belt 9, and a second row of even higher amplitudes belongs to the corresponding first harmonic f2; i.e, to the double rotational frequency of conveyor belt 9. Looking at FIG. 4, it becomes clear that the rotational frequency f1 corresponds to the time difference between the respective first of the two peaks 27 and 28 (e.g., it is defined by the time period the conveyor belt takes to pass one of the pulleys 20 or 21, respectively). That the rotational frequency f1 is so clearly visible in the frequency spectrum is due to the above described effect of the splice region.

FIG. 6 differs from FIG. 5 only in that the torque "M" of motor 23 is shown instead of rotational speed "n". Here, the amplitudes at the rotational frequency f1 of conveyor belt 9 and at its first harmonic f2 are again very prominent.

It is now explained with the help of FIG. 7, how the long time tests of conveyor belt 9 were performed. In FIG. 7, a filtered speed signal n_filt and a filtered torque signal M_filt of motor 23 are shown for subsequent periods of time, where the filtering was performed with a band-pass filter in order to extract the first harmonic f2 from the respective signals "n" and "M" and where the uppermost diagrams of each filtered signal, n_filt1 and M_filt1, both show a first period of time at the beginning of one of the tests, the diagrams in the middle, n_filt2 and M_filt2, belong to a second period of time in the middle of the test, and the respective lowest diagrams, n_filt3 and M_filt3, both show a third period of time close to the end of the test.

The general aim of the tests was to put the conveyor belt under considerable mechanical stress in order to simulate heavy operating conditions and in order to find out whether a weakening of the conveyor belt would be detectable in measured operating variables of motor 23. During the third period time of FIG. 7, the conveyor belt 9 started to show clear signs of wear, and afterwards the test ended with the conveyor belt 9 starting to crack.

As can be seen from the uppermost diagrams of n_filt and M_filt, the amplitudes increase and decrease in a cyclic way in both signals, where each cycle takes about 50 seconds. This is due to an external force which was applied periodically to conveyor belt 9 with exactly a cycle time of 50 seconds in order to simulate a cyclic load on the belt.

It was recognized that shortly before the conveyor belt starts to crack, the amplitudes of n_filt and M_filt are reduced considerably (e.g., the amplitudes of the respective first harmonic f2 of the rotational belt frequency f1 are reduced), where these amplitudes equal to the peaks in the rotational speed "n" and the torque "M" of the motor caused by the splice region. This effect can be clearly seen not only in FIG. 7 but also in FIGS. 5 and 6 where the amplitudes of n and M decrease towards the end of time axis "t". A possible explanation for the reduced amplitudes is that the stiffness of the splice region fades with increased wearing of the belt material, so that the mechanical impact on the drive and idler pulleys is less intense.

Torque "M" and rotational speed "n" are mechanical operating variables of motor 23. Since the torque "M" corresponds to the electrical current, similar effects as described herein were also visible in this electrical operating variable of motor 23.

As was recognized by the inventors, due to the irregularities or peaks occurring in the sensor signals of the operating variables of motor 23, these signals can be used to implement a system and a method for monitoring the condition of conveyor belt 9. Examples for the components of such a system are shown in FIGS. 2 and 3.

Figure 2:
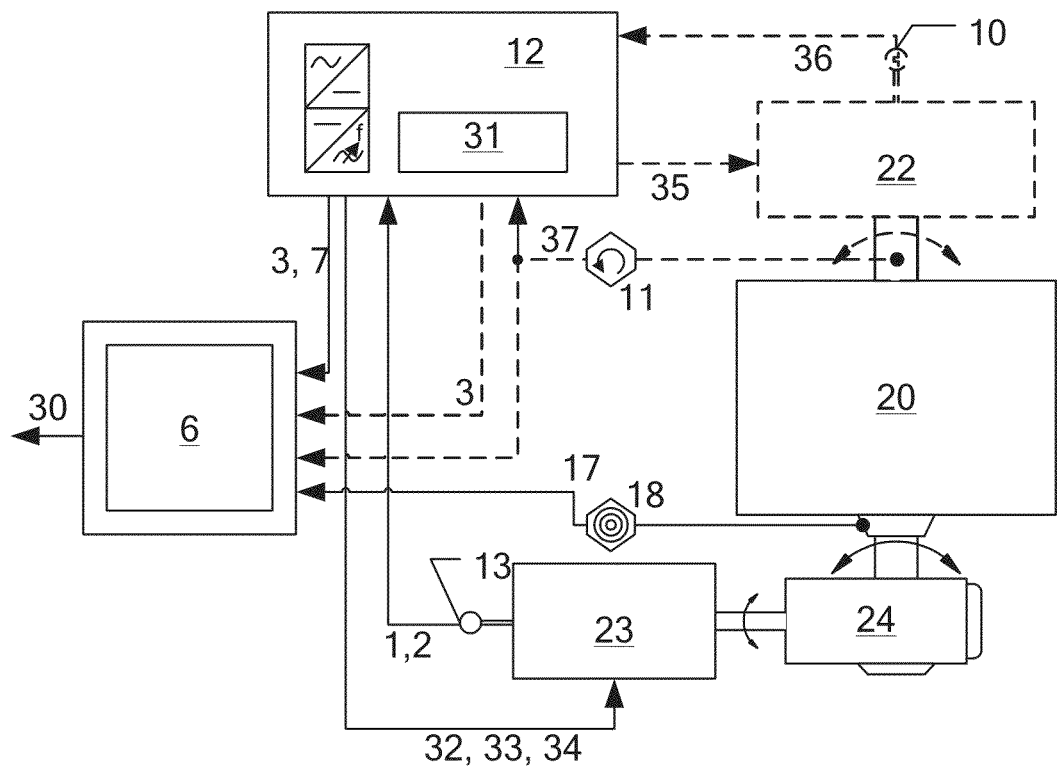
FIG. 2 shows an exemplary system for monitoring a condition of a conveyor belt.
Figure 3:
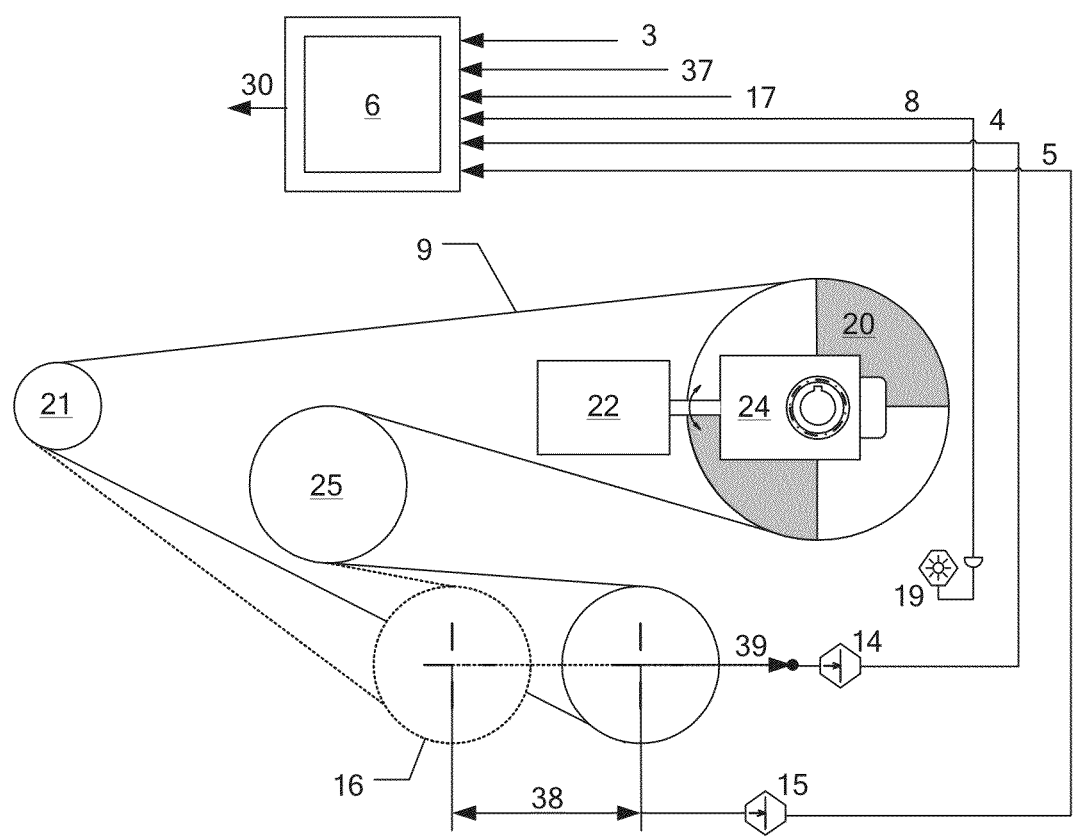
FIG. 3 shows an exemplary part of the system of FIG. 2 with further sensor units.

In FIG. 2, a top view of exemplary motor 23 and gear 24 applying a driving force to drive pulley 20 of conveyor belt 9 is shown. Motor 23 is for example, a permanent magnet induction motor. In order to operate motor 23, a frequency converter 12 is installed. During normal operation of conveyor belt 9, the frequency converter 12 receives current signals 1 and 2 from a current sensor unit 13, where the current signals 1 and 2 represent the stator currents of two of the three windings of motor 23. From the two current signals 1 and 2, a processing unit 31 in converter 12 derives data signal 3 of the rotational speed "n" and data signal 7 of the torque "M" of motor 23 and determines signals for the voltages 32, 33, 34 to be applied to the three windings of motor 23. The three voltages 32 to 34 are then generated by the power electronic part of converter 12.

In order to implement a system and method for monitoring the condition of conveyor belt 9, a further data processing unit 6 is installed which receives the data signals 3 and 7 of rotational speed and torque, respectively, from converter 12. Data processing unit 6 detects in at least one of the data signals 3 and 7 the irregularities or peaks which indicate that splice region 26 passed the drive pulley 20 and/or the idler pulley 21. These irregularities or peaks are detected for multiple points in time, so that a change in the shape or frequency of the irregularities can be recognized, and from this change it is determined whether the condition of the conveyor belt has changed or not. When applying the above explained findings with respect to FIGS. 4 to 6, data processing unit 6 would detect an imminent crack in conveyor belt 9 from a reduction in the amplitude of the first harmonic f2 in data signal 3 or in data signal 7 or in both data signals or in corresponding frequency spectra. In a later step, processing unit 6 sends a monitoring output signal 30, which for example, is a data message, to at least one of a display unit, a storage unit, such as a data logger or historian server, and/or a decision making unit. The output signal 30 reflects the detected change in the condition of the conveyor belt. In the example of FIGS. 4 to 6, the output signal 30 could for example be an alarm stating that a crack in conveyor belt 9 is likely to occur soon or it could be a direct instruction to stop the conveyor belt 9 as soon as possible and to carry out maintenance measures. Data signal 30 may be sent out continuously or only when a change in the condition of the conveyor belt occurs.

In FIG. 2, an exemplary alternative driving concept of drive pulley 20 and alternative ways to obtain sensor signals of operating variables are illustrated in dotted lines. Instead of a motor and gear, a gearless motor 22 could be used, which is mechanically coupled in direct connection to the shaft or drum of drive pulley 20. A sensor signal 36 of the rotational speed of motor 22 is obtained by a speed encoder 10 and a sensor signal 37 of the torque by a torque transducer 11. These two sensor signals 36 and 37 are transmitted to the frequency converter 12, where they are processed and used as described herein way for the purpose of controlling the motor 22. The processing unit 31 generates from sensor signal 36 the data signal 3 of the rotational speed of motor 22 and sends it to the processing unit 6. In contrast to the previous described example with respect to motor 23 plus gear 24, the data signal 7 of the torque of motor 22 is generated from sensor signal 37 by the processing unit 6 instead of the processing unit 31 of converter 12. The data signals 3 and 7 are again used for the monitoring of the condition of conveyor belt 9 in the same way as already described.

In addition to operating variables of motors 22 or 23, respectively, further sensor information can be used to improve the reliability and availability of the output signal 30 of processing unit 6. For example, a vibration measurement unit 18 may deliver a vibration sensor signal 17, where the vibration measuring unit 18 measures the vibration of a mechanical part which is attached to motor 23, such as the drum of drive pulley 20, the gear 24 or a bearing in the shaft of drive pulley 20. In the vibration sensor signal 17, the passing of splice region 26 at one of the pulleys 20 or 21 is detectable in a similar manner as in the operating variables of motor 23.

Further sensor information which may be used by processing unit 6 for improving the result of the condition monitoring is shown in FIG. 3. In comparison to FIG. 2, only the gearless motor 22 is depicted together with drive pulley 20, this time in a side view. The conveyor belt 9 is arranged to rotate further about a take-up pulley 16 and a further idler pulley 25. Take-up pulley 16 can be used to apply a predefined tension to conveyor belt 9, where the tension is achieved through a displacement of the take-up pulley 16. The displacement 38 is measured by a distance measurement unit 15 and is delivered as a displacement sensor signal 5 to processing unit 6. In addition, the tension 39 of the conveyor belt 9 may be measured by a force measurement 14 and transmitted to processing unit 6 as a belt tension sensor signal 4.

Even further, the processing unit 6 may take into account for the condition monitoring an image sensor signal 8 delivered by a radiation sensor 19 which observes the conveyor belt 9.

All of these sensor signals can be obtained without any requirement for the integration of embedded sensor parts or elements in the conveyor belt (e.g., all of these sensing methods are non-invasive and can be installed and implemented with considerable little effort).

Therefore, It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for monitoring a condition of a conveyor belt arranged to rotate about at least a drive pulley and an idler pulley, where an electrical motor is arranged to drive the drive pulley, the system comprising:
- at least one data processing unit;
- at least one sensor unit arranged to determine at least one sensor signal representing at least one operating variable of an electrical motor, the at least one data processing unit being configured to:
- derive from the at least one sensor signal at least one corresponding time dependent data signal;
- detect irregularities in the at least one data signal which indicate that a splice region of a conveyor belt passes the drive pulley and/or the idler pulley;
- determine from a change in shape or frequency of the irregularities whether a condition of the conveyor belt has changed; and
- send a monitoring output signal which reflects a change in the condition of the conveyor belt to at least one of a display unit, a storage unit and/or a decision making unit.

2. The system according to claim 1, where the at least one sensor unit is a current and/or voltage sensor, a speed encoder, a torque transducer or a force transducer.

3. The system according to claim 1, where the at least one data signal represents an amplitude over time or a frequency spectrum.

4. The system according to claim 1, where the at least one data processing unit is a stand-alone processing device and/or an integrated part of an electrical converter, configured for connection to an electrical motor and arranged to supply a current and/or voltage to the electrical motor.

5. The system according to claim 1, where the at least one data processing unit is configured to determine whether a condition of the conveyor belt has changed by comparing the shape and/or frequency of irregularities with a corresponding threshold or with a shape frequency of a reference irregularity or by using a model-based state observer.

6. The system according to claim 1, where the at least one data processing unit is configured to determine a change in the shape of irregularities from a change in amplitude height and/or from a change in width of peaks of the irregularities.

7. The system according to claim 1, in combination with an electrical motor for driving a drive pulley of a conveyor belt, wherein:
- the at least one sensor unit is arranged to determine a first sensor signal and a second sensor signal representing a first and a second operating variable of the electrical motor, respectively; and
- where the at least one data processing unit is arranged to derive corresponding first and second data signals and to detect irregularities either in the first data signal if the corresponding operating variable of the electrical motor is controlled to follow a first reference variable, or in the second data signal if the corresponding operating variable of the electrical motor is controlled to follow a second reference variable.

8. The system according to claim 1, comprising:
- a vibration measurement unit, where the at least one data processing unit is arranged to determine a change in condition of a conveyor belt by taking into account a vibration sensor signal delivered by the vibration measurement unit measuring vibration of a mechanical part attached to the electrical motor.

9. The system according to claim 1, in combination with a conveyor belt arranged to rotate about a drive pulley, an idler pulley and a take-up pulley, where the at least one data processing unit is configured to determine a change in the condition of the conveyor belt by taking into account a displacement sensor signal delivered by a distance measurement unit measuring the displacement of the take-up pulley.

10. The system according to claim 1, where the at least one data processing unit is configured to determine a change in condition of a conveyor belt by taking into account a belt tension sensor signal delivered by a force measurement unit.

11. The system according to claim 1, where the at least one data processing unit is configured to determine a change in condition of a conveyor belt by taking into account an image sensor signal delivered by a radiation sensor which observes the conveyor belt.

12. The system according to claim 1, where the at least one operating variable is one of a voltage, a current, a rotational speed, an acceleration, a torque or a force.

13. The system according to claim 12, where the at least one sensor unit is a current and/or voltage sensor, a speed encoder, a torque transducer or a force transducer.

14. A method for monitoring the condition of a conveyor belt, where the conveyor belt is arranged to rotate about at least a drive pulley and an idler pulley and where an electrical motor is arranged to drive the drive pulley, the method comprising:
- determining at least one sensor signal representing at least one operating variable of the electrical motor;
- deriving from the at least one sensor signal at least one corresponding time dependent data signal;
- detecting irregularities in the at least one data signal which indicate that a splice region of the conveyor belt passes the drive pulley and/or the idler pulley;
- determining from a change in shape or in points in time of the irregularities whether a condition of the conveyor belt has changed; and
- sending a monitoring output signal which reflects a change in the condition of the conveyor belt to at least one of a display unit, a storage unit and/or a decision making unit.

15. The system according to claim 13, where the at least one data signal represents an amplitude over time or a frequency spectrum.

16. The system according to claim 15, where the at least one data processing unit is a stand-alone processing device and/or an integrated part of an electrical converter, configured for connection to an electrical motor and arranged to supply a current and/or voltage to the electrical motor.

17. The system according to claim 16, where the at least one data processing unit is configured to determine whether a condition of the conveyor belt has changed by comparing the shape and/or frequency of irregularities with a corresponding threshold or with a shape frequency of a reference irregularity or by using a model-based state observer.

18. The system according to claim 17, in combination with an electrical motor for driving a drive pulley of a conveyor belt, wherein:
- the at least one sensor unit is arranged to determine a first sensor signal and a second sensor signal representing a first and a second operating variable of the electrical motor, respectively; and
- where the at least one data processing unit is arranged to derive corresponding first and second data signals and to detect irregularities either in the first data signal if the corresponding operating variable of the electrical motor is controlled to follow a first reference variable, or in the second data signal if the corresponding operating variable of the electrical motor is controlled to follow a second reference variable.

19. The system according to claim 18, comprising:
a vibration measurement unit, where the at least one data processing unit is arranged to determine a change in condition of a conveyor belt by taking into account a vibration sensor signal delivered by the vibration measurement unit measuring vibration of a mechanical part attached to the electrical motor.

20. The system according to claim 19, in combination with a conveyor belt arranged to rotate about a drive pulley, an idler pulley and a take-up pulley, where the at least one data processing unit is configured to determine a change in the condition of the conveyor belt by taking into account a displacement sensor signal delivered by a distance measurement unit measuring the displacement of the take-up pulley.

* * * * *